(12) United States Patent
Iftissen (10) Patent No.: US 10,858,835 B2
(45) Date of Patent: Dec. 8, 2020

(54) SEALING RING AND ASSEMBLY OF DUCTS INCLUDING SAID RING

(71) Applicant: Gérard Iftissen, Saint Martin d'Uriage (FR)

(72) Inventor: Gérard Iftissen, Saint Martin d'Uriage (FR)

( * ) Notice: Subject to any disclaimer, the term of this patent is extended or adjusted under 35 U.S.C. 154(b) by 171 days.

(21) Appl. No.: 16/073,733

(22) PCT Filed: Jan. 27, 2017

(86) PCT No.: PCT/EP2017/051771
§ 371 (c)(1),
(2) Date: Jul. 27, 2018

(87) PCT Pub. No.: WO2017/129746
PCT Pub. Date: Aug. 3, 2017

(65) Prior Publication Data
US 2019/0010703 A1   Jan. 10, 2019

(30) Foreign Application Priority Data

Jan. 29, 2016  (FR) ...................... 16 50720

(51) Int. Cl.
*F16L 25/14* (2006.01)
*E04D 13/04* (2006.01)
(Continued)

(52) U.S. Cl.
CPC ............ *E04D 13/0409* (2013.01); *F16L 7/02* (2013.01); *F16L 21/035* (2013.01); *F16L 25/14* (2013.01);
(Continued)

(58) Field of Classification Search
CPC ........ E04D 13/0409; E04D 2013/0436; E04D 2013/044; F16L 7/02; F16L 21/035; F16L 25/14
See application file for complete search history.

(56) References Cited

U.S. PATENT DOCUMENTS

2002/0153725 A1   10/2002   Myers

FOREIGN PATENT DOCUMENTS

CN    104763809 A       7/2015
DE    299 11 322 U1     8/1999
(Continued)

OTHER PUBLICATIONS

International Search Report dated Feb. 15, 2017, issued in corresponding International Application No. PCT/EP2017/051771, filed Jan. 27, 2017, 6 pages.

*Primary Examiner* — Gilbert Y Lee
(74) *Attorney, Agent, or Firm* — Christensen O'Connor Johnson Kindness PLLC (57) ABSTRACT

The invention relates to a sealing ring including, axially, a main portion (2) and a secondary portion (3), connected by a weakened intermediate portion (4) which can be broken under an axial force applied between the main portion and the secondary portion, the main portion (2) including an annular sealing sleeve (5) and a projecting outer shoulder (6) arranged at the end of the annular sealing sleeve (5), opposite the breakable portion (4), and the secondary portion (3) including a projecting inner shoulder (10). Said annular sleeve (5) of the main portion (2) of the ring can be inserted between ducts (16, 17) that are inserted into one another, said projecting outer shoulder (6) of the main portion (2) abutting against the end of the outer duct surrounding the inner duct, and said projecting inner shoul- (Continued)

der (10) of the secondary portion (3) abutting against the end of the outer tube that is inserted into the outer duct.

14 Claims, 7 Drawing Sheets

(51) Int. Cl.
    *F16L 7/02*         (2006.01)
    *F16L 21/035*    (2006.01)

(52) U.S. Cl.
    CPC ................ *E04D 2013/044* (2013.01); *E04D 2013/0436* (2013.01)

(56) References Cited

FOREIGN PATENT DOCUMENTS

| | | | |
|---|---|---|---|
| DE | 299 06 821 U1 | 9/1999 | |
| FR | 1 448 157 A | 1/1966 | |
| FR | 3047291 A1 * | 8/2017 | .............. F16L 25/14 |

\* cited by examiner

SEALING RING AND ASSEMBLY OF DUCTS INCLUDING SAID RING

The present invention concerns the field of the devices employed to evacuate rainwater, in particular from the roofs of buildings and from terraces.

The flat slabs of roofs and of terraces generally include holes that are equipped with portions of ducts that pass through them and have an upper end connected to the upper seal of the slabs. The lower end of these duct portions is engaged in the upper end of vertical evacuation ducts connected to evacuation networks.

U.S. Pat. No. 5,966,884 describes a sealing device that comprises a flexible sealing ring installed between a shoulder of the lower end of a duct portion and a rigid ring connected to this shoulder by screws. After placing in a vertical duct, the screws are maneuvered to move the rigid ring toward the shoulder and thus to deform the sealing ring toward the outside and to load it pressed against the interior face of the vertical evacuation duct. This sealing device necessitates a particular implementation of the lower end of the duct portion and necessitates a tool of great length, difficult to couple to the heads of the screws and difficult to maneuver on the installation site.

French patent 1 448 157 describes a sealing device that comprises a ring trapped between an exterior duct and an interior duct and having an interior shoulder bearing on the end of the interior duct that comprises an annular lip connected to the ring by elastic branches and comes to bear on the end of the exterior duct. The elastic deformation of the elastic portion, which determines the force with which the annular lip bears on the end of the interior duct, is limited by the fact that the interior shoulder of the ring comes to bear against an interior shoulder of the exterior duct.

An object of the present invention is to create a seal between two ducts in a simpler and adaptable manner.

According to one embodiment, there is proposed a sealing ring comprising, axially, a main part and a secondary part, connected by a weakened intermediate portion which can be broken by an axial force applied between the main part and the secondary part.

The main part includes an annular exterior and interior sealing sleeve and a projecting exterior shoulder bearing axially on the side of the breakable portion, arranged at the end of the annular sealing sleeve, axially distanced from the breakable portion.

Moreover, the secondary part includes a projecting interior shoulder bearing axially on the side of the breakable portion.

Said breakable portion may have at least one section reduced relative to the annular sealing sleeve and/or at least one slot.

Said secondary part may include a secondary annular portion connected to the sealing annular sleeve by said breakable portion, said interior shoulder being arranged at the end of the secondary annular portion opposite said breakable portion.

Said secondary annular portion may be in line with said sealing annular sleeve.

Said interior shoulder may be provided with an annular groove open axially on the side of the main part.

Said annular sealing sleeve may be provided with annular exterior lips.

Said exterior shoulder may be in a material more rigid than that of said annular sealing sleeve.

At least said interior shoulder of the secondary part may be in a material more rigid than that of said annular sealing sleeve.

Said sealing may be intended to create a seal between two ducts engaged one in the other.

There is also proposed an assembly comprising an interior duct and an exterior duct engaged one in the other, these ducts being provided with a sealing ring.

Said ring is mounted so that said annular sealing sleeve of the main part of the ring is inserted between said ducts, said projecting exterior shoulder of the main part is abutted against the end of the exterior duct around the interior duct and said projecting interior shoulder of the secondary part is abutted against the end of the exterior tube engaged in the exterior duct.

The weakened portion may be breakable by an axial force greater than that allowing the engagement of said annular sleeve between said ducts.

The end of the interior duct may be engaged in the groove of the interior shoulder of the secondary part.

There is also proposed a method of assembling an interior duct, an exterior duct and a sealing ring.

The method comprises: mounting said main part of the sealing ring around the interior duct, the projecting interior shoulder of the secondary part coming to abut against the end of this interior duct, and engaging in the exterior duct the secondary part and the annular sleeve of the main part of the sealing ring, at the same time as the interior duct, until the projecting exterior shoulder of the main part comes to abut against the end of the exterior tube.

The method may comprise: continuing the movement so as to cause said breakable portion to break.

A sealing ring and an assembly of ducts including this ring are described next by way of nonlimiting example, illustrated by the drawings, in which.

Figure 1:
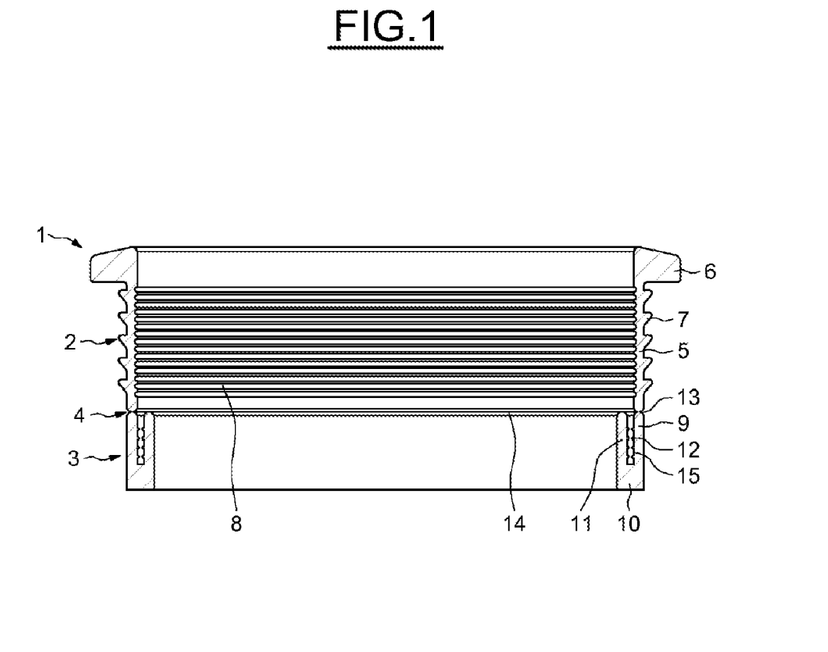
FIG. 1 represents a longitudinal section of a sealing ring.
Figure 2:
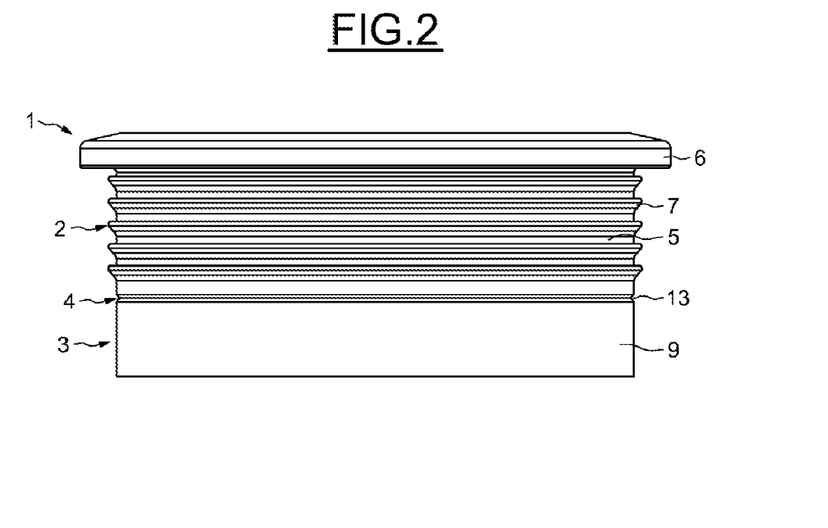
FIG. 2 represents a side view of the sealing ring from FIG. 1.

In FIGS. 1 and 2 there is shown a sealing ring 1 which comprises, axially, a main part 2 and a secondary part 3 connected by a weakened portion 4 that can be broken.

The main part 2 comprises a cylindrical annular sleeve 5 for exterior and interior sealing and an exterior shoulder 6 provided at the end of the cylindrical sleeve 5, this shoulder being axially spaced from the breakable weakened intermediate portion 4 and projecting radially outward relative to the cylindrical portion 5, so that the cylindrical sleeve 5 extends at least in part between the exterior shoulder 6 and the breakable weakened portion 4 and so that the shoulder 5 forms an axial bearing oriented on the side of the weakened portion 4.

The cylindrical sleeve 5 is provided with a plurality of axially spaced projecting external annular sealing lips 7, the exterior shoulder 6 projecting radially relative to these projecting lips.

The cylindrical sleeve 5 has inside it a plurality of axially spaced interior grooves 8.

The exterior shoulder 6 may extend over all the circumference of the cylindrical sleeve 5 or may be formed by spaced circumferential portions.

The secondary part 3 comprises a cylindrical portion 9 that extends axially in line with the cylindrical portion 5 and an interior shoulder 10 provided at the end of this annular portion 9, this shoulder being axially spaced from the breakable weakened portion 4 and projecting radially inward relative to the cylindrical portion 9 so that the interior shoulder 10 forms an axial bearing oriented on the side of the weakened portion 4.

The secondary part 3 further comprises an interior annular portion 11 that extends axially from the interior shoulder 9 toward the main part 2 so that there is formed between the cylindrical portion 9 and the interior annular portion 11 an annular groove 12 oriented axially toward the main part 2.

The interior annular portion 11 may extend over all the circumference of the interior shoulder 10 or may be formed by spaced circumferential portions. In this latter case, the interior annular shoulder 10 may be formed by spaced circumferential portions provided with spaced circumferential portions forming the interior shoulder 10. The cylindrical portion 9 may equally be formed by spaced circumferential portions provided with spaced circumferential portions forming the interior shoulder 10.

The breakable weakened portion 4 connecting the main part 2 and the secondary part 3 can be broken by a particular axial force applied between the main part 2 and the secondary part 3.

For example, to this end, the breakable weakened portion 4 may be of reduced section relative to the section of the cylindrical sleeve 5 of the main part 2 and of the cylindrical portion 9 of the secondary part 3. In addition or alternatively, the breakable weakened portion 4 may have an exterior annular groove 13 and/or an interior annular groove 14. The breakable weakened portion 4 may have radial slots or perforations (not shown) that pass through it.

The annular groove 12 may have in one or both of its flanks projecting annular lips 15.

Figure 3:
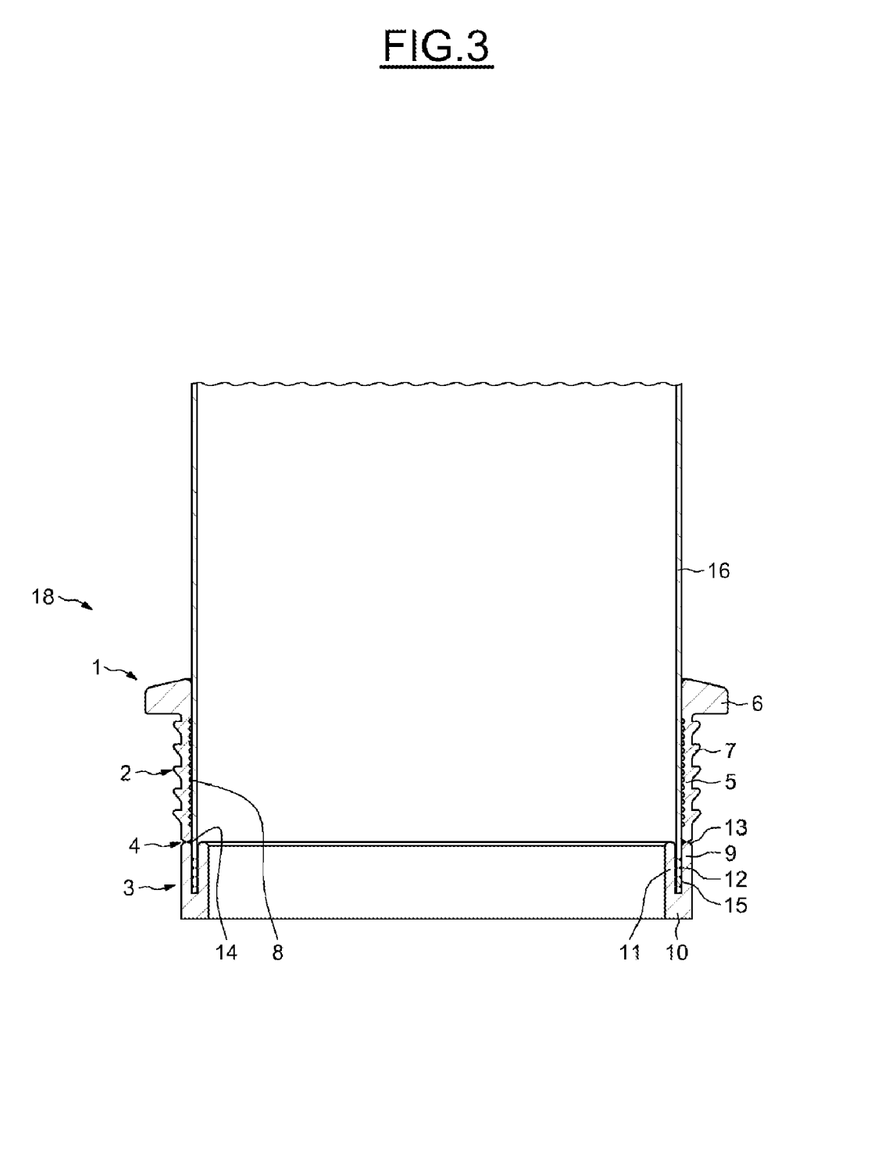
FIG. 3 represents a longitudinal section of an interior duct provided with the sealing ring from FIG. 1.

As shown in FIG. 3, the sealing ring 1 may be mounted as follows on an end portion of an interior duct 16 by an operator.

To this end, the end of the interior duct 16 is introduced axially into the cylindrical sleeve 5 of the main part 2 and then into the cylindrical portion 9 of the secondary part 3, passing through the breakable weakened portion 4, and is engaged inside the annular groove 12 until it comes to bear against the interior shoulder 10.

The inside diameter of the cylindrical sleeve 5 of the main part 2 and of the cylindrical portion 9 of the secondary part 3 is such that this assembly is produced by sliding. The section of the annular groove 12 is adapted to the section of the interior duct 16 to pinch its end.

Figure 4:
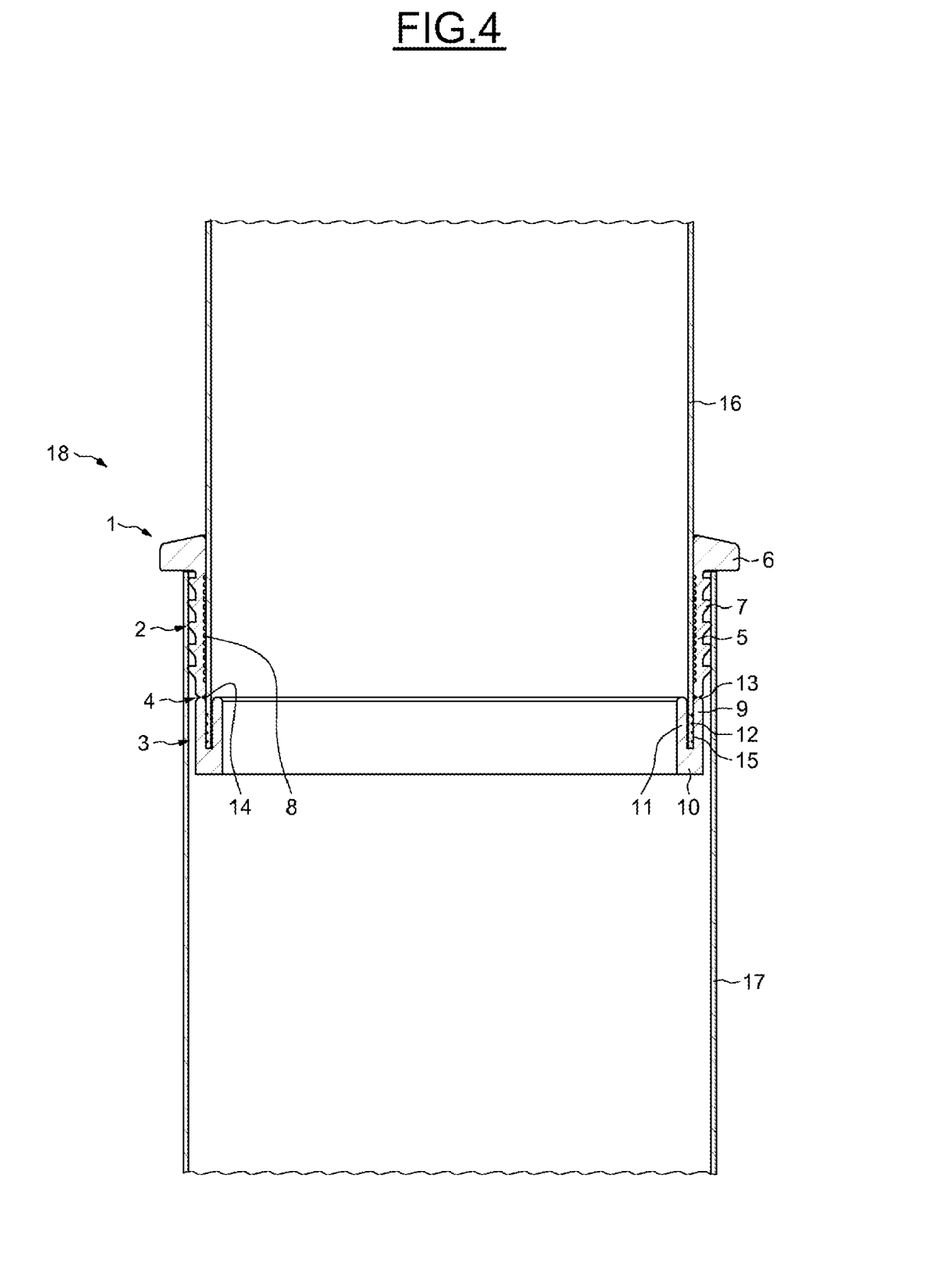
FIG. 4 represents a longitudinal section of an assembly of an interior duct and an exterior duct, provided with the sealing ring from FIG. 1, in an assembly position.

As shown in FIG. 4, the interior duct 16 provided with the sealing ring 1 may be coupled as follows to an exterior duct 17 by an operator to form an assembly 18.

To this end, the end of the exterior duct 17 is passed around the cylindrical portion 9 of the secondary part 3 and is then engaged around the exterior annular lip 7 of the cylindrical sleeve 5 of the main sealing portion 2 by sliding it until the end of the exterior duct 17 comes to bear axially against the exterior shoulder 6 of the main part 2.

The cylindrical sleeve 5 of the main sealing portion 2 and the breakable weakened portion 4 are adapted and sized so that this assembly can be produced by sliding without the breakable weakened portion 4 breaking and so that the cylindrical sleeve 5 of the main sealing portion 2, disposed between the interior duct 16 and the exterior duct 17, establishes a required seal between these ducts 16 and 17.

An operator may exert an increased axial force between the ducts 16 and 17 in the direction of continued engagement of the interior duct 16 in the exterior duct 17, this force being greater than that which made possible the assembly described above.

This increased axial force generates an axial loading force between the main part 2 of the sealing ring 1, the exterior shoulder 6 of which is held pressed against the end of the exterior duct 17, and the secondary part 3 of the sealing ring 1, the interior shoulder 10 of which is held pressed against the end of the interior duct 16.

As shown in FIG. 4, this axial loading force causes the breakable weakened portion 4 to break, so that the ducts 16 and 17 can be moved into a required axial adjustment position relative to one another in a telescopic manner.

Figure 5:
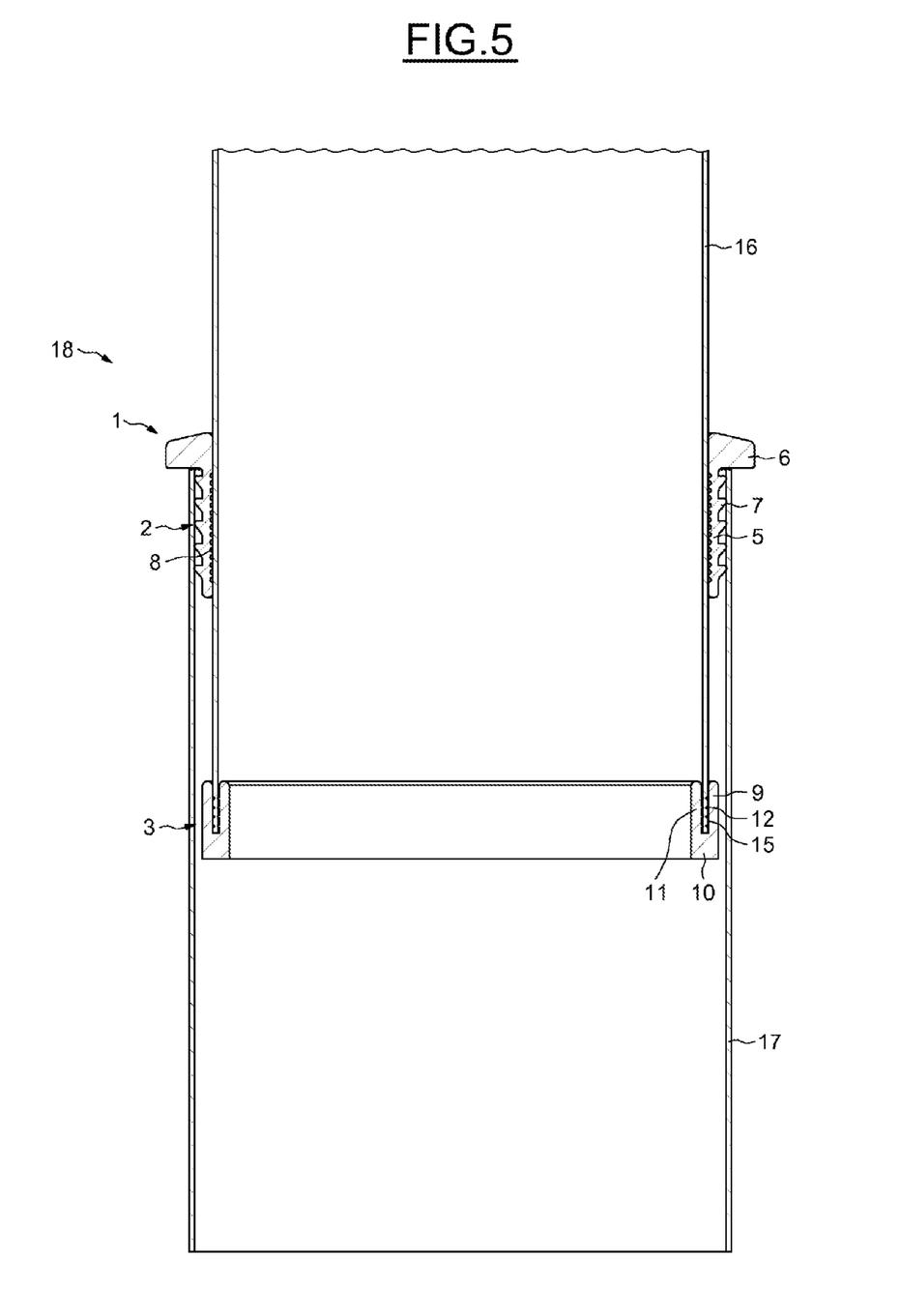
FIG. 5 represents a longitudinal section of the assembly from FIG. 4, in another assembly position.

In doing this, the main part 2 of the sealing ring 1 remains at its position relative to the exterior duct 17 and the interior duct 16 slides in the cylindrical portion 5 and takes with it the secondary part 3 of the sealing ring 1, separated from the main part 2 and with its interior shoulder 10 bearing against the end of the interior duct 16. The secondary part 3 of the sealing ring 1 remains attached to the interior duct 16 thanks to the pinching of the latter in the annular groove 12.

The sealing ring 1 may be in one or more synthetic materials by a molding process.

The exterior shoulder 6 and the secondary part 4 may be in one or more synthetic materials more rigid than the material constituting the cylindrical portion 5. Accordingly, the forces necessary for the assembly described above can be withstood, whilst providing the necessary seal.

Figure 6:
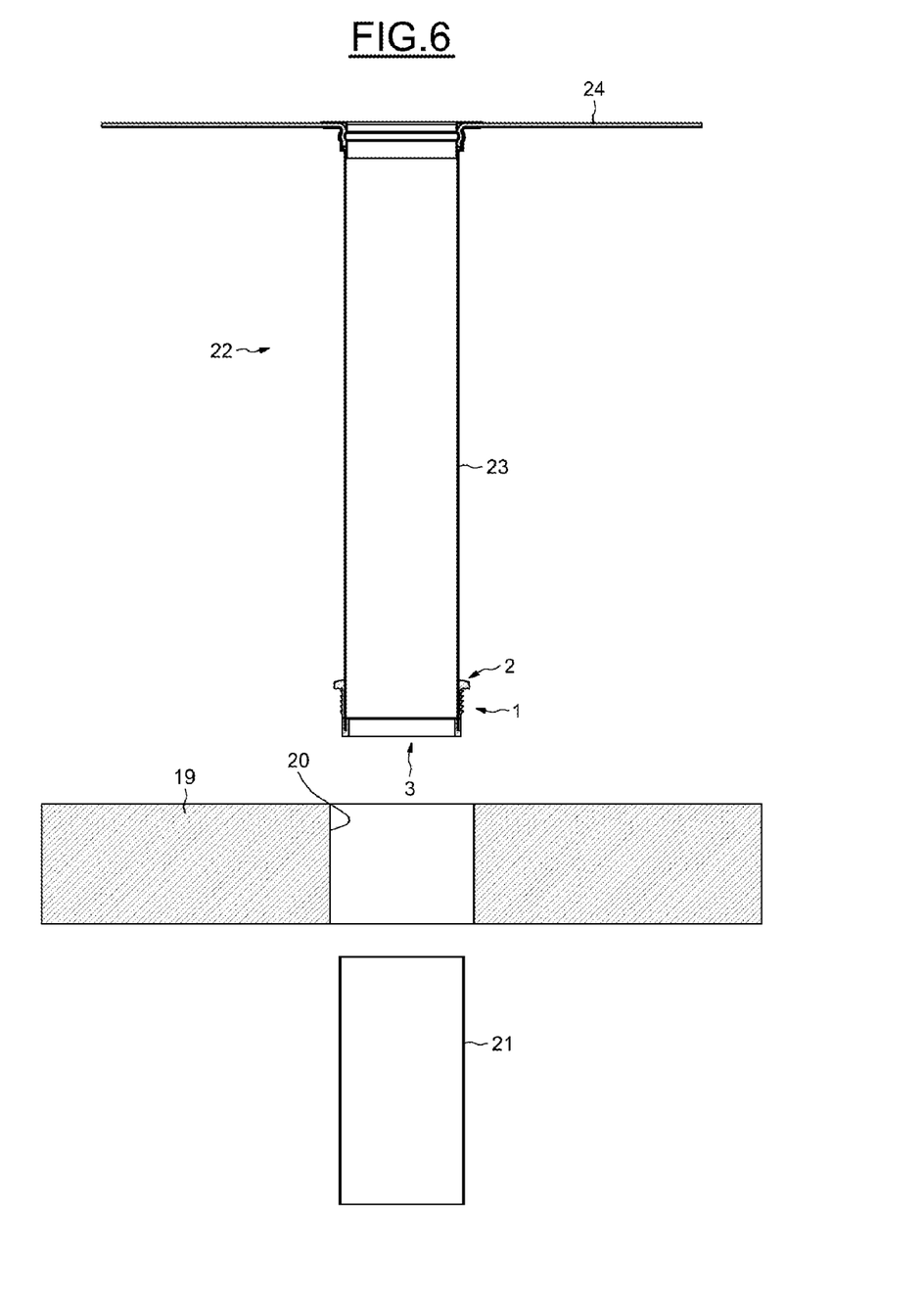
FIGS. 6, 7 and 8 represent views corresponding to FIGS. 3, 4 and 5 of an application of the ring from FIG. 1 in a particular assembly.
Figure 7:
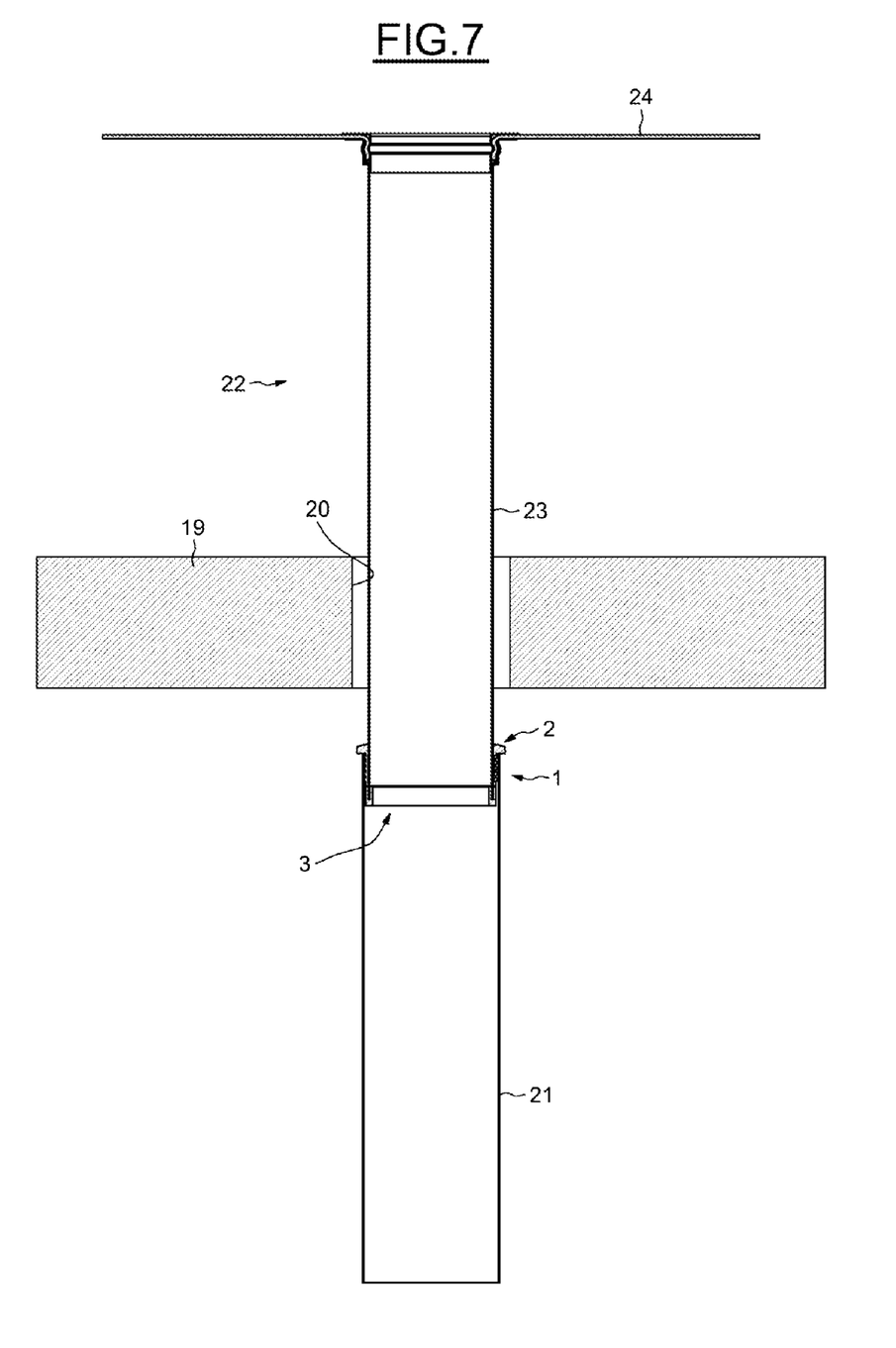
Figure 8:
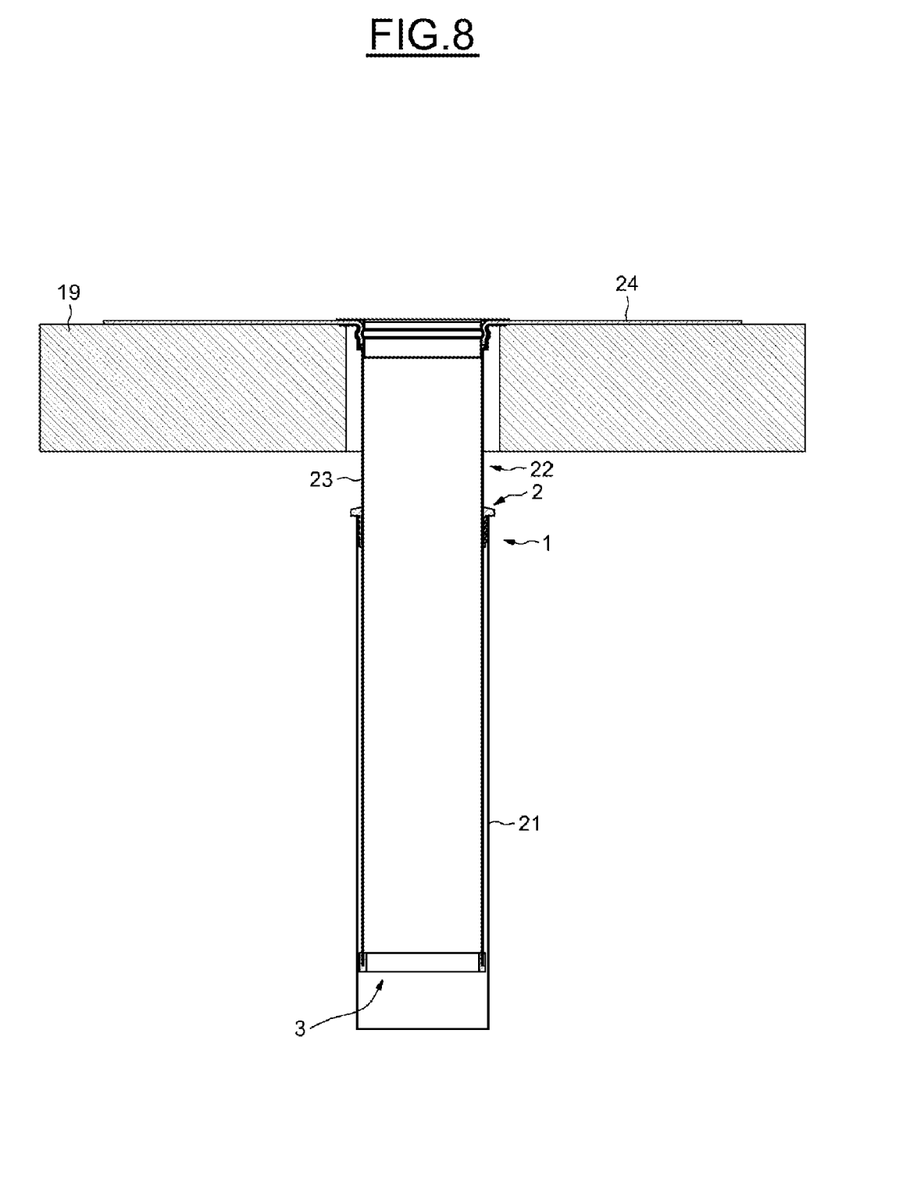

An example of application of the sealing ring 1 is shown in FIGS. 6, 7 and 8.

A horizontal slab 19 of a building or of a terrace has a passage 20 through it under which is provided a vertical evacuation duct 21 for rain water for example. This duct 21 is equivalent to the exterior duct 17 mentioned above.

A connection device 22 comprises a duct 23 provided, at one end, with a radial membrane 24. This duct 23 is equivalent to the aforementioned interior duct 16.

As represented in FIG. 6, an operator mounts on the end of the duct 23, opposite the membrane 24, a sealing ring 1, conforming to what was described above with reference to FIG. 3.

As represented in FIG. 7, the operator engages the duct 23 through the passage 20 through the slab 19 and engages the sealing ring 1 carried by this duct 23 in the vertical duct 21, conforming to what is described above with reference to FIG. 4.

Then, as represented in FIG. 8, the operator continues the movement of the duct 23, conforming to what has been described above with reference to FIG. 5, causing the breakable portion 4 of the sealing ring 1 to break, until the membrane 24 comes to bear on the slab 19. After this, the operator makes a fluid-tight connection between the membrane 24 and a surface seal of the slab 24.

The sealing ring 1 therefore establishes a seal between the ducts 22 and 23, simultaneously with the operation of coupling the latter and without additional intervention, becoming independent of the final relative axial adjustment positions of the ducts 22 and 23.

The sealing ring 1 may be obtained by a molding process.

The sealing ring 1 may equally be obtained by extrusion through a die of a profiled member the section of which corresponds to its axial section, cutting a portion of this profiled member, and then coiling and welding the ends of this portion.

The exterior shoulder 6 may be in a material more rigid than that of the annular sleeve 5.

The interior shoulder 10 of the secondary part 3 or this secondary part in its entirety may be in a material more rigid than that of the annular sleeve 5.

The weakened portion 4 may be less rigid than the annular sleeve 5 and/or the secondary part 3.

The sealing ring 1 may be in one or more different rubber materials or in one or more special elastomers such as EPDM.

The invention claimed is:

1. A sealing ring comprising, axially, a main part and a secondary part, connected by a weakened intermediate portion,
the main part including annular exterior and interior sealing sleeves and a projecting exterior shoulder bearing axially on the side of the breakable portion and arranged at the end of the annular sealing sleeve, the secondary part including a projecting interior shoulder bearing axially on the side of the breakable portion,
wherein the weakened intermediate portion is adapted to be breakable by an axial force applied between the main part and the secondary part, and
wherein the projecting exterior shoulder of the main part is axially distanced from the breakable portion.

2. The ring as claimed in claim 1, in which the breakable portion has at least one section reduced relative to the annular sealing sleeve and/or at least one slot.

3. The ring as claimed in claim 1, in which the secondary part includes a secondary annular portion connected to the sealing annular sleeve by said breakable portion, said interior shoulder being arranged at the end of the secondary annular portion opposite said breakable portion.

4. The ring as claimed in claim 3, in which said secondary annular portion is in line with said sealing annular sleeve.

5. The ring as claimed in claim 1, in which the interior shoulder is provided with an annular groove open axially on the side of the main part.

6. The ring as claimed in claim 1, in which said annular sealing sleeve is provided with annular exterior lips.

7. The ring as claimed in claim 1, in which said exterior shoulder is in a material more rigid than that of said annular sealing sleeve.

8. The ring as claimed in claim 1, in which at least said interior shoulder of the secondary part is in a material more rigid than that of said annular sealing sleeve.

9. The ring as claimed in claim 1, intended to create a seal between two pipes engaged one in the other.

10. An assembly comprising an interior duct and an exterior duct engaged one in the other, these ducts being provided with a sealing ring as claimed in claim 1, in which said annular sealing sleeve of the main part of the ring is inserted between said ducts, said projecting exterior shoulder of the main part is abutted against the end of the exterior duct around the interior duct and said projecting interior shoulder of the secondary part is abutted against the end of the exterior tube engaged in the exterior duct.

11. The assembly as claimed in claim 10, in which the weakened portion can be broken under an axial force greater than that allowing the engagement of said annular sleeve between said ducts.

12. The assembly as claimed in claim 10, in which the end of the interior duct is engaged in the groove of the interior shoulder of the secondary part.

13. A method of assembling an interior duct, an exterior duct and a sealing ring as claimed in claim 1, comprising:
mounting the main part of the sealing ring around the interior duct, the projecting interior shoulder of the secondary part coming to abut against the end of this interior duct,
engaging in the exterior duct the secondary part and the annular sleeve of the main part of the sealing ring, at the same time as the interior duct, until the projecting exterior shoulder of the main part comes to abut against the end of the exterior tube.

14. The method as claimed in claim 13, comprising:
continuing the movement so as to cause said breakable portion to break.

* * * * *